(12) United States Patent
Maeda (10) Patent No.: US 12,099,977 B2
(45) Date of Patent: Sep. 24, 2024

(54) VEHICLE REPAIR SUPPORT SYSTEM AND VEHICLE REPAIR SUPPORT METHOD

(71) Applicant: TOYOTA JIDOSHA KABUSHIKI KAISHA, Toyota (JP)

(72) Inventor: Toshio Maeda, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 140 days.

(21) Appl. No.: 17/875,995

(22) Filed: Jul. 28, 2022

(65) Prior Publication Data

US 2023/0096960 A1   Mar. 30, 2023

(30) Foreign Application Priority Data

Sep. 24, 2021  (JP) ................................. 2021-155042

(51) Int. Cl.
*G06Q 30/00* (2023.01)
*G06Q 10/20* (2023.01)

(52) U.S. Cl.
CPC .................................... *G06Q 10/20* (2013.01)

(58) Field of Classification Search
CPC ..................................................... G06Q 10/20
See application file for complete search history.

(56) References Cited

U.S. PATENT DOCUMENTS

| | | | | |
|---|---|---|---|---|
| 10,372,953 B1* | 8/2019 | Bondarenko | .......... | G06Q 10/20 |
| 10,540,529 B1* | 1/2020 | Bondarenko | ........ | G06K 7/1417 |
| 10,817,686 B1* | 10/2020 | Bondarenko | .......... | G06Q 10/20 |
| 11,704,514 B1* | 7/2023 | Bondarenko | ........ | G06K 7/1413 |
| | | | | 235/385 |
| 11,769,119 B1* | 9/2023 | Faga | ...................... | G06Q 10/20 |
| | | | | 705/305 |
| 2005/0125261 A1* | 6/2005 | Adegan | .................. | G06Q 40/08 |
| | | | | 705/4 |
| 2005/0267764 A1* | 12/2005 | Uegaki | .................. | G06Q 10/06 |
| | | | | 705/302 |
| 2006/0136239 A1* | 6/2006 | Kagan | .................... | G06Q 10/30 |
| | | | | 705/308 |
| 2006/0184383 A1* | 8/2006 | Davis | ..................... | G06Q 30/06 |
| | | | | 705/16 |
| 2007/0202857 A1* | 8/2007 | Hara | ...................... | G07C 5/006 |
| | | | | 455/414.1 |

(Continued)

FOREIGN PATENT DOCUMENTS

| | | |
|---|---|---|
| JP | 2002-251490 A | 9/2002 |
| JP | 2004-240649 A | 8/2004 |

(Continued)

*Primary Examiner* — Luis A Brown
(74) *Attorney, Agent, or Firm* — Dinsmore & Shohl LLP (57) ABSTRACT

A vehicle repair support system for supporting repair of a failed vehicle includes a storage device configured to store IDs of a plurality of donor vehicles registered in advance and parts mounted on the donor vehicles in association with each other, a support management device configured to specify a repair part needed to repair the failed vehicle based on defect information for the failed vehicle, and extract the donor vehicles on which the repair part is mounted from among the donor vehicles based on information stored in the storage device, and a request notification device configured to notify an owner of the donor vehicle extracted by the support management device of a request to provide the repair part.

15 Claims, 8 Drawing Sheets

(56) References Cited

U.S. PATENT DOCUMENTS

| | | | | |
|---|---|---|---|---|
| 2012/0123951 A1* | 5/2012 | Hyatt | ................... | G06Q 10/10 |
| | | | | 705/305 |
| 2012/0136527 A1* | 5/2012 | McQuade | .............. | G06Q 30/08 |
| | | | | 705/26.4 |
| 2014/0074865 A1* | 3/2014 | Zobrist | ................. | G06Q 10/06 |
| | | | | 707/E17.014 |
| 2015/0012169 A1* | 1/2015 | Coard | .............. | G06Q 10/06316 |
| | | | | 705/305 |
| 2017/0132575 A1* | 5/2017 | Buren | ................ | G06Q 10/1095 |
| 2017/0228709 A1* | 8/2017 | Dhaliwal | ............... | G07C 5/008 |
| 2022/0374789 A1* | 11/2022 | Tone | ..................... | G06Q 10/02 |
| 2022/0414615 A1* | 12/2022 | Tone | ..................... | G06Q 10/20 |

FOREIGN PATENT DOCUMENTS

| | | | | |
|---|---|---|---|---|
| JP | 2004-265057 A | | 9/2004 | |
| WO | WO-2019018980 A1 * | | 1/2019 | ........... G06K 9/6277 |

\* cited by examiner

FIG. 2

| DONOR VEHICLE ID: XXXXXXXXXXX | | | | | | 09 / 2021 |
|---|---|---|---|---|---|---|
| SUN | MON | TUE | WED | THU | FRI | SAT |
| | | | 1 | 2 | 3 | 4 |
| 5 | 6 | 7 | 8 | 9 | 10 | 11 |
| 12 | 13 | 14 | 15 | 16 | 17 | 18 |
| 19 | 20 | 21 | 22 | 23 | 24 | 25 |
| 26 | 27 | 28 | 29 | 30 | | |

⟷ : NON-OPERATING DATE    NON-OPERATION PROBABILITY : 9

VEHICLE REPAIR SUPPORT SYSTEM AND VEHICLE REPAIR SUPPORT METHOD

CROSS-REFERENCE TO RELATED APPLICATION

This application claims priority to Japanese Patent Application No. 2021-155042 filed on Sep. 24, 2021, incorporated herein by reference in its entirety.

BACKGROUND

1. Technical Field

The present disclosure relates to a vehicle repair support system and a vehicle repair support method for supporting the repair of a failed vehicle.

2. Description of Related Art

In the related art, there is known an after-sales service support system that automatically grasps the status of an automobile failure, automatically arranges needed maintenance parts and replacement parts, and road service vehicles, taxis, or the like, and makes maintenance parts and replacement parts available (see, for example, Japanese Unexamined Patent Application Publication No. 2002-251490 (JP 2002-251490 A)). This after-sales service support system includes a data communication controller that receives information about the state of an automobile, a support plan generator that creates ordering information for automobile repair based on the information about the state of the automobile, and an ordering information controller that transmits repair work reservations and/or parts reservations to a repair shop and/or a production factory based on the ordering information. With such after-sales service, it is possible to save the trouble of an owner of an automobile when the automobile fails.

SUMMARY

However, even if maintenance parts and replacement parts are automatically arranged as in the after-sales service support system in the related art, it takes a certain amount of time from when the vehicle fails until the parts are actually delivered and replaced. Meanwhile, when various parts are stocked at a dealer shop or a repair shop, it is possible to quickly repair a failed vehicle; however, stocking the parts requires space and cost, and it is likely that the stocked parts will not be used and will be wasted.

Therefore, aspects of the present disclosure are to provide a vehicle repair support system and a vehicle repair support method that enable rapid procurement of repair parts needed to repair a failed vehicle while the stock of parts is reduced.

A first aspect of the present disclosure relates to a vehicle repair support system for supporting repair of a failed vehicle. The vehicle repair support system includes a storage device, a support management device, and a request notification device. The storage device is configured to store IDs of a plurality of donor vehicles registered in advance and parts mounted on the donor vehicles in association with each other. The support management device is configured to specify a repair part needed to repair the failed vehicle based on defect information for the failed vehicle, and extract the donor vehicles on which the repair part is mounted from among the donor vehicles based on information stored in the storage device. The request notification device is configured to notify an owner of the donor vehicle extracted by the support management device of a request to provide the repair part.

The vehicle repair support system of the present disclosure mainly supports the procurement of parts in repairing the failed vehicle, and includes the storage device, the support management device, and the request notification device. The storage device stores IDs of the donor vehicles registered in advance and parts mounted on the donor vehicles in association with each other. In addition, the support management device specifies a repair part needed to repair the failed vehicle based on defect information for the failed vehicle, and extracts the donor vehicles on which the repair part is mounted from among the donor vehicles based on information stored in the storage device. Further, the request notification device notifies the owner of the donor vehicle extracted by the support management device of the request to provide the repair part. In this way, it is possible to remove the repair part from the donor vehicle and mount the removed repair part on the failed vehicle, when the owner of the donor vehicle accepts the request to provide the repair part, thereby resolving the failure of the failed vehicle. As a result, it is possible to quickly procure repair parts needed to repair a failed vehicle while the stock of parts at a vehicle dealer shop, a vehicle maintenance shop, or the like is reduced.

Further, the support management device may give an incentive to the owner who has accepted the request to provide the repair part. In this way, it is possible to urge the owner of the donor vehicle to accept the request to provide the repair part, which makes it possible to procure the repair part more quickly.

Further, the support management device may increase the incentive given to the owner when a degree of deterioration of the repair part provided from the donor vehicle is small, as compared with when the degree of deterioration is large. In this way, even if the donor vehicle is relatively new, it is possible to suppress a reluctant feeling of the owner of the donor vehicle in providing the repair part, which makes it possible to procure a good repair part.

Further, the vehicle repair support system may further include a part deterioration diagnosis device configured to acquire usage state information including at least a mileage from the donor vehicle and derive the degree of deterioration of the part mounted on the donor vehicle based on the usage state information, and the support management device may set the incentive given to the owner based on the degree of deterioration of the repair part acquired from the part deterioration diagnosis device. This makes it possible to properly evaluate the degree of deterioration of the part mounted on the donor vehicle and to ensure good reliability in procurement of the repair part from the donor vehicle.

Further, the vehicle repair support system may further include a billing amount calculation device configured to calculate a billing amount for repair for the user of the failed vehicle, and reduce the billing amount when the failed vehicle is registered as the donor vehicle as compared with when the failed vehicle is not registered as the donor vehicle. By giving the owner of the donor vehicle the merit of reducing the cost burden in the event of a failure as described above, it is possible to further promote the registration of donor vehicles and increase the number of registered donor vehicles.

Further, the vehicle repair support system may further include a failure information management device configured to provide information on the repair part according to the defect information, and the support management device may inquire of the failure information management device about the repair part needed to repair the failed vehicle. This makes it possible to easily and quickly specify the repair part needed to repair the failed vehicle.

Further, the defect information may be transmitted from a business operator who has received a request to repair the failed vehicle to the support management device, and the request notification device may be installed in the business operator. In this way, it is possible to directly arrange an operating schedule or the like between the owner of the donor vehicle and the business operator as a contact point for repairing the failed vehicle, which makes it possible to shorten the time from the request to repair the failed vehicle to the repair completion.

Further, the support management device may narrow down the donor vehicles to the donor vehicle on which the repair part is mounted based on a scheduled repair date for the failed vehicle and non-operating date information indicating scheduled non-operating dates of the donor vehicles. In this way, it is possible to restrain the owner of the donor vehicle who cannot provide the repair part by the scheduled repair date due to the operation from being notified of the request to provide the repair part, and to further increase the probability that the request to provide the repair part is accepted.

Further, the non-operating date information may include a probability that the donor vehicle is non-operating on the scheduled non-operating date provided from the owner of the donor vehicle, the probability being set based on the scheduled non-operating date and a usage status of the donor vehicle, the storage device may store the non-operating date information in association with the ID of the donor vehicle, and the support management device may preferentially extract the donor vehicle for which the probability is relatively high from among the donor vehicles on which the repair part is mounted based on the non-operating date information. In this way, it is possible to extremely well restrain the owner of the donor vehicle who cannot provide the repair part by the scheduled repair date due to the operation from being notified of the request to provide the repair part.

Further, the support management device may acquire at least a distance between a position of the donor vehicle and a location of a repairer for removing the repair part from the donor vehicle, and preferentially extract the donor vehicle to which the distance is relatively short from among the donor vehicles on which the repair part is mounted. In this way, it is possible to further shorten the time from the request to repair the failed vehicle to the acquisition of the repair part, and to reduce the distribution cost needed to procure the part.

Further, the repair part removed from the donor vehicle may be mounted on the failed vehicle, and a separately ordered part may be mounted on the donor vehicle. That is, in response to the provision of the repair part, a new part may be provided as an incentive to the owner of the donor vehicle.

Further, after the repair part removed from the donor vehicle is temporarily mounted on the failed vehicle, the repair part may be returned to the donor vehicle and a separately ordered part may be mounted on the failed vehicle. In this way, it is possible to meet the intention of the owner of the donor vehicle who wants to continue to use parts mounted from the beginning.

Further, after the repair part removed from the donor vehicle is temporarily mounted on the failed vehicle, a separately ordered part may be mounted on each of the donor vehicle and the failed vehicle and the repair part removed from the failed vehicle may be stocked.

Further, the donor vehicles may include at least one of a private car, a used car, a car-sharing vehicle, an exhibition car, and a rental car. In this way, it is possible to quickly repair the failed vehicle by effectively utilizing the parts mounted on idle vehicles such as non-operating private cars, rental cars, car-sharing vehicles, and used cars, which makes it possible to satisfactorily reduce the downtime of the failed vehicle.

A second aspect of the present disclosure relates to a vehicle repair support method for supporting repair of a failed vehicle. The vehicle repair support method includes storing IDs of a plurality of donor vehicles registered in advance and parts mounted on the donor vehicles in association with each other in a storage device, specifying a repair part needed to repair the failed vehicle based on defect information for the failed vehicle, extracting the donor vehicles on which the repair part is mounted from among the donor vehicles based on information stored in the storage device, and requesting an owner of the extracted donor vehicle to provide the repair part.

With the method described above, it is possible to quickly procure repair parts needed to repair a failed vehicle while the stock of parts at a vehicle dealer shop, a vehicle maintenance shop, or the like is reduced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Next, an embodiment of the disclosure will be described with reference to the drawings.

Figure 1:
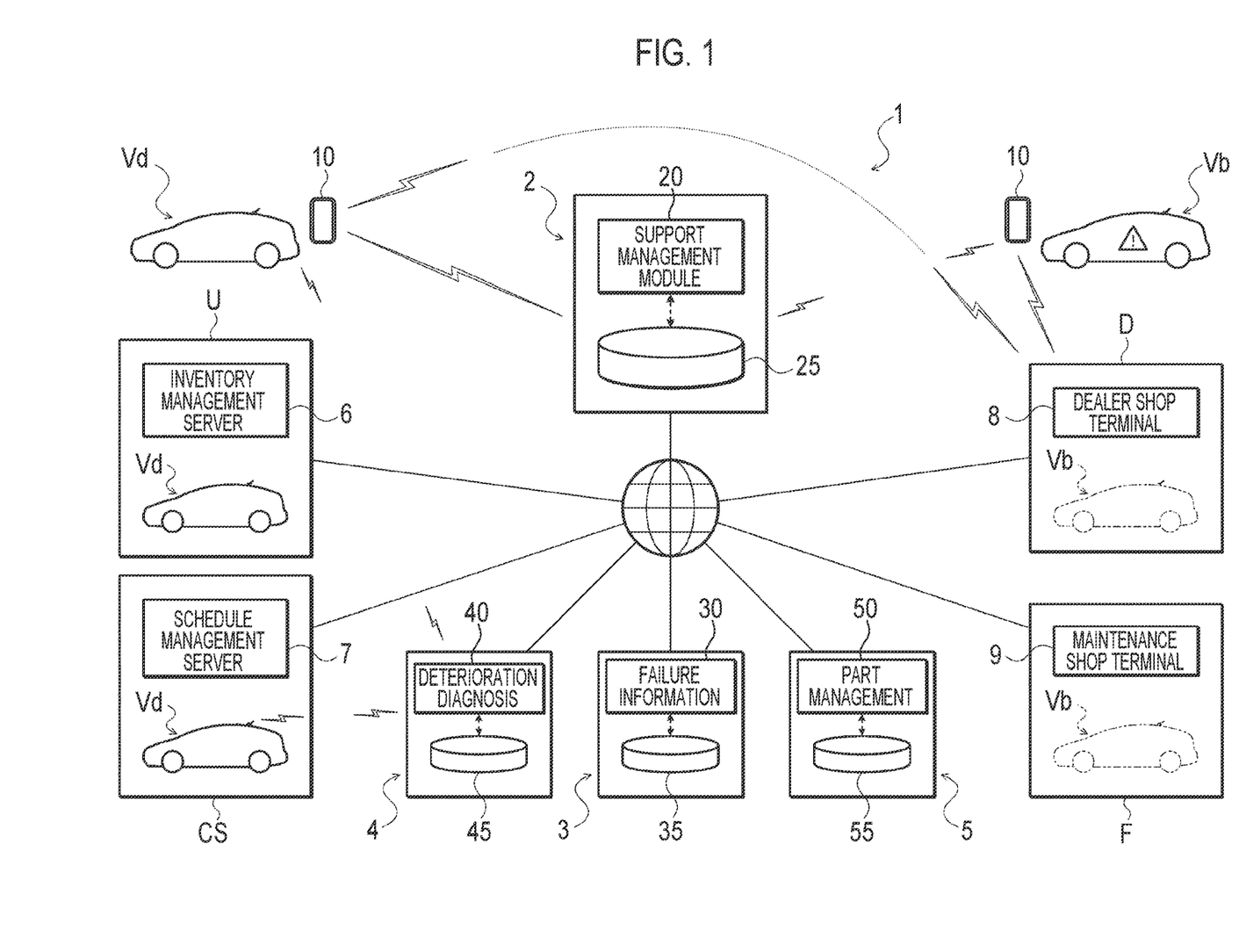
FIG. 1 is a schematic configuration diagram showing a vehicle repair support system of the present disclosure.

FIG. 1 is a schematic configuration diagram showing a vehicle repair support system 1 of the present disclosure. As shown in the figure, a vehicle repair support system 1 mainly supports the procurement of parts in repairing a failed vehicle Vb. More specifically, the vehicle repair support system 1 supports procuring repair parts needed to repair the failed vehicle Vb from a plurality of donor vehicles Vd stored in advance. The donor vehicles Vd are vehicles for which owners of the vehicles have agreed to provide one or more parts mounted on the donor vehicles Vd in response to a request from a vehicle dealer shop D, a vehicle maintenance shop F, or the like, that has received the repair of failed vehicle Vb. The owners of the donor vehicles Vd who have accepted the request for providing repair parts are given an incentive from the vehicle repair support system 1.

In the present embodiment, the donor vehicle Vd is registered in the vehicle repair support system 1 in response to an application from the owner of the donor vehicle Vd, for example, at the time of vehicle acquisition or after acquisition. In addition to private cars owned by individuals, donor vehicles Vd include used cars sold by a used car sales dealer U, car-sharing vehicles owned and managed by a car sharing operator CS, rental cars owned and managed by a car rental operator (not shown), exhibition cars on display at a vehicle dealer shop D, and the like.

As shown in FIG. 1, the vehicle repair support system 1 includes a repair support server 2, a failure information management server (failure information management device) 3, a vehicle diagnosis server (part deterioration diagnosis device) 4, a part distribution management server (part distribution management device) 5, an inventory management device 6 of the used car sales dealer U, a schedule management device 7 of the car sharing operator CS, a terminal 8 installed in the vehicle dealer shop D and a terminal 9 installed in the vehicle maintenance shop F. The repair support server 2, the failure information management server 3, the vehicle diagnosis server 4, the part distribution management server 5, the inventory management device 6, the schedule management device 7, and the terminals 8, 9 can exchange information with each other via a network such as the Internet.

The repair support server 2 is a computer including a CPU, ROM, RAM, an input/output device, and the like, and is installed and managed by, for example, an automobile manufacturer in the present embodiment. In the repair support server 2, a support management module (support management device) 20 is built that executes various support processes related to the repair of the failed vehicle Vb by cooperating with hardware such as a CPU, ROM, and RAM and various programs installed in advance. Further, the repair support server 2 includes a storage device 25 that stores a database that stores information needed to support repair of the failed vehicle Vb for each of the donor vehicles Vd. The database may store vehicle information such as the chassis number or vehicle identification number and information such as an ID of the (removable) part that can be provided by the donor vehicle Vd, an ID, contact number, address, or location of the owner of the donor vehicle Vd, in association with an ID of the donor vehicle Vd, and may be updated every time a new donor vehicle Vd is registered.

Further, the repair support server 2 can exchange information with a user terminal 10 such as a smartphone or a personal computer owned by the owner (individual) of the donor vehicle Vd or the user of the failed vehicle Vb via the network. In the present embodiment, the support management module 20 of the repair support server 2 transmits, to the owner (individual) of the donor vehicle Vd, a notification request for a scheduled non-operating date, which is the day when the donor vehicle Vd is not scheduled to be used, at predetermined intervals. The owner of the donor vehicle Vd transmits the scheduled non-operating dates of his/her donor vehicle Vd to the repair support server 2 when he/she receives the notification request for the scheduled non-operating date or when a usage schedule is decided. The support management module 20 of the repair support server 2 creates, for example, non-operating date information by month as shown in FIG. 2 based on the scheduled non-operating dates transmitted from the owner of the donor vehicle Vd, and stores the non-operating date information in association with the ID of the donor vehicle Vd in the database.

Figure 2:
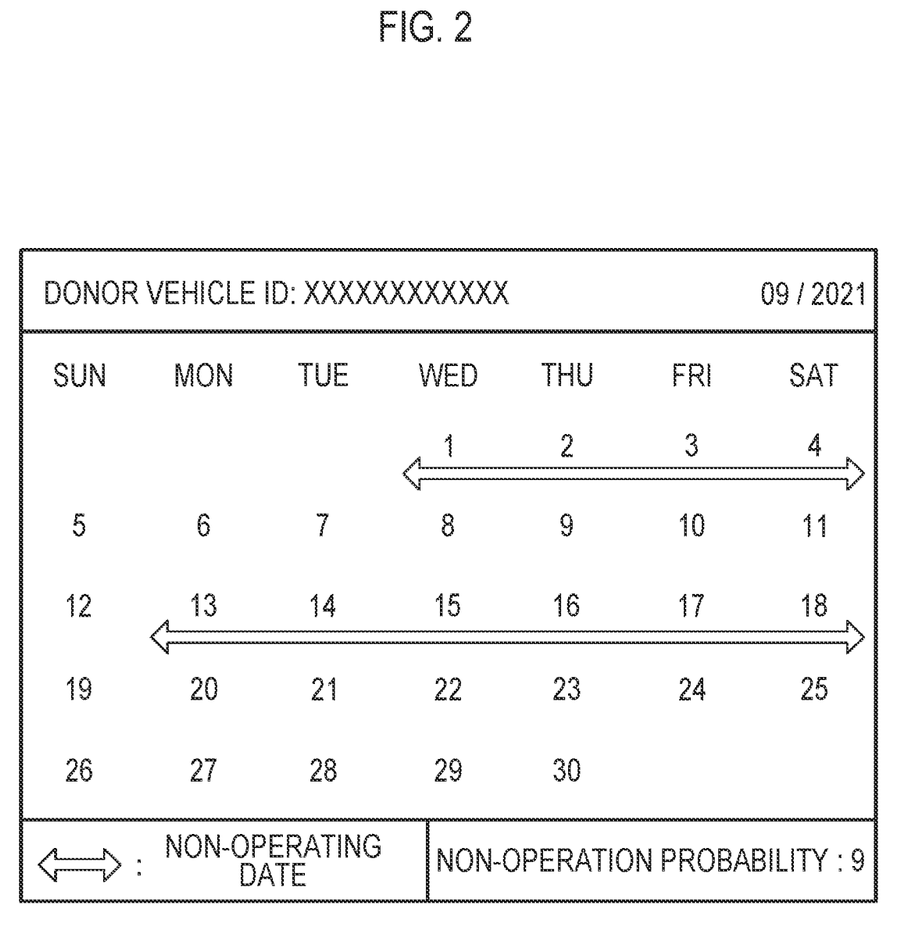
FIG. 2 is an explanatory diagram illustrating non-operating date information used in the vehicle repair support system of the present disclosure.

Further, as shown in FIG. 2, the non-operating date information for each donor vehicle Vd includes a non-operation probability indicating a probability that the donor vehicle Vd will actually be non-operating on the scheduled non-operating date. That is, the support management module 20 of the repair support server 2 acquires a usage status (whether or not traveling) of the donor vehicle Vd from an in-vehicle communication device mounted on each donor vehicle Vd, for example, at night every day, and determines whether or not each donor vehicle Vd is actually non-operating on the scheduled non-operating date. Then, the support management module 20 derives the non-operation probability of each donor vehicle Vd based on the usage status, and updates the non-operating date information.

In the present embodiment, the non-operation probability is represented by an integer of ten steps, and the support management module 20 holds the non-operation probability at the current value when, for example, the donor vehicle Vd is non-operating on the scheduled non-operating date. Further, the support management module 20 reduces the non-operation probability by "1" when, for example, there is one operating date out of ten scheduled non-operating dates, and reduce the non-operation probability by "2" when there are two operating dates out of ten scheduled non-operating dates. Further, the support management module 20 increases the non-operation probability by "1" when, for example, the non-operation probability is an integer less than 10, and there is no operating date out of ten scheduled non-operating dates.

The failure information management server 3 is a computer including a CPU, ROM, RAM, an input/output device, and the like, and is installed and managed by, for example, an automobile manufacturer in the present embodiment. In the failure information management server 3, a failure information processing module 30 is built that executes various processes to provide information on repair parts by a failure (defect) that occurs in a vehicle manufactured and sold by the automobile manufacturer in cooperation with hardware such as a CPU, ROM, and RAM and various programs installed in advance. Further, the failure information management server 3 includes a storage device 35 that stores a database that stores failure information for each of a plurality of diagnosis codes. The database stores failure information such as diagnostic conditions, abnormal states, abnormal periods, specific symptoms of defects, inspection sites, and IDs of parts to be replaced in association with the diagnosis codes.

The vehicle diagnosis server 4 is a computer including a CPU, ROM, RAM, an input/output device, and the like, and is installed and managed by, for example, an automobile manufacturer in the present embodiment. In the vehicle diagnosis server 4, a deterioration diagnosis module 40 is built that diagnose a degree of deterioration of a vehicle manufactured and sold by the automobile manufacturer and parts mounted on the vehicle in cooperation with hardware such as a CPU, ROM, and RAM and various programs installed in advance. The deterioration diagnosis module 40 sequentially acquires usage state information such as a mileage, engine speed, load (torque), vehicle speed, brake on time, and steering angle of the vehicle from in-vehicle communication devices mounted on many vehicles including the donor vehicle Vd, and derives the degree of deterioration of each vehicle and parts mounted on each vehicle. Further, the vehicle diagnosis server 4 includes a storage device 45 that stores a database storing the degree of deterioration of the vehicle or each part for each of a plurality of vehicles. The database stores the degree of deterioration of the vehicle or each part that is derived by the deterioration diagnosis module 40, in association with the chassis number or vehicle identification number of the vehicle. The deterioration diagnosis module 40 updates the database every time the degree of deterioration of the vehicle or each part is derived.

The part distribution management server 5 is a computer including a CPU, ROM, RAM, an input/output device, and the like, and is installed and managed by, for example, an automobile manufacturer in the present embodiment. In the part distribution management server 5, a distribution management module 50 is built that manages inventory, arrival status, orders, shipments, and the like, of parts mounted on a vehicle manufactured and sold by the automobile manufacturer and parts mounted on the vehicle in cooperation with hardware such as a CPU, ROM, and RAM and various programs installed in advance. Further, the part distribution management server 5 includes a storage device 55 that stores a database that stores inventory, arrival status, and the like, for each of a large number of parts. The distribution management module 50 updates the database every time the inventory status of parts or the like changes.

The inventory management device 6 of the used car sales dealer U is a computer including a CPU, ROM, RAM, an input/output device, and the like, and manages an inventory status of used cars handled by the used car sales dealer U. Further, the inventory management device 6 periodically transmits, to the repair support server 2, the scheduled non-operating date of the donor vehicle Vd registered in the vehicle repair support system 1 by the used car sales dealer U. The support management module 20 of the repair support server 2 creates, for example, non-operating date information by month based on the scheduled non-operating dates transmitted from the inventory management device 6, and stores the non-operating date information in association with the ID of the donor vehicle Vd of the used car sales dealer U in the database.

The schedule management device 7 of the car sharing operator CS is a computer including a CPU, ROM, RAM, an input/output device, and the like, and manages the operating status of vehicles and the like handled by the car sharing operator CS. Further, the schedule management device 7 periodically transmits, to the repair support server 2, the scheduled non-operating date of the donor vehicle Vd registered in the vehicle repair support system 1 by the car sharing operator CS. The support management module 20 of the repair support server 2 creates, for example, non-operating date information by month based on the scheduled non-operating dates transmitted from the schedule management device 7, and stores the non-operating date information in association with the ID of the donor vehicle Vd of the car sharing operator CS in the database.

The terminals 8, 9 of the vehicle dealer shop D and the vehicle maintenance shop F are all computers including a CPU, ROM, RAM, an input/output device, and the like. In addition to the repair support server 2 and the like, each of the terminals 8, 9 can exchange information, via the network, with a user terminal 10 owned by the owner of the donor vehicle Vd (the individual, used car sales dealer U, car sharing operator CS, or the like) or the user of the failed vehicle Vb.

Subsequently, a procedure for supporting the repair of the failed vehicle Vb by the vehicle repair support system 1 will be described with reference to FIGS. 3 to 6.

Figure 3:
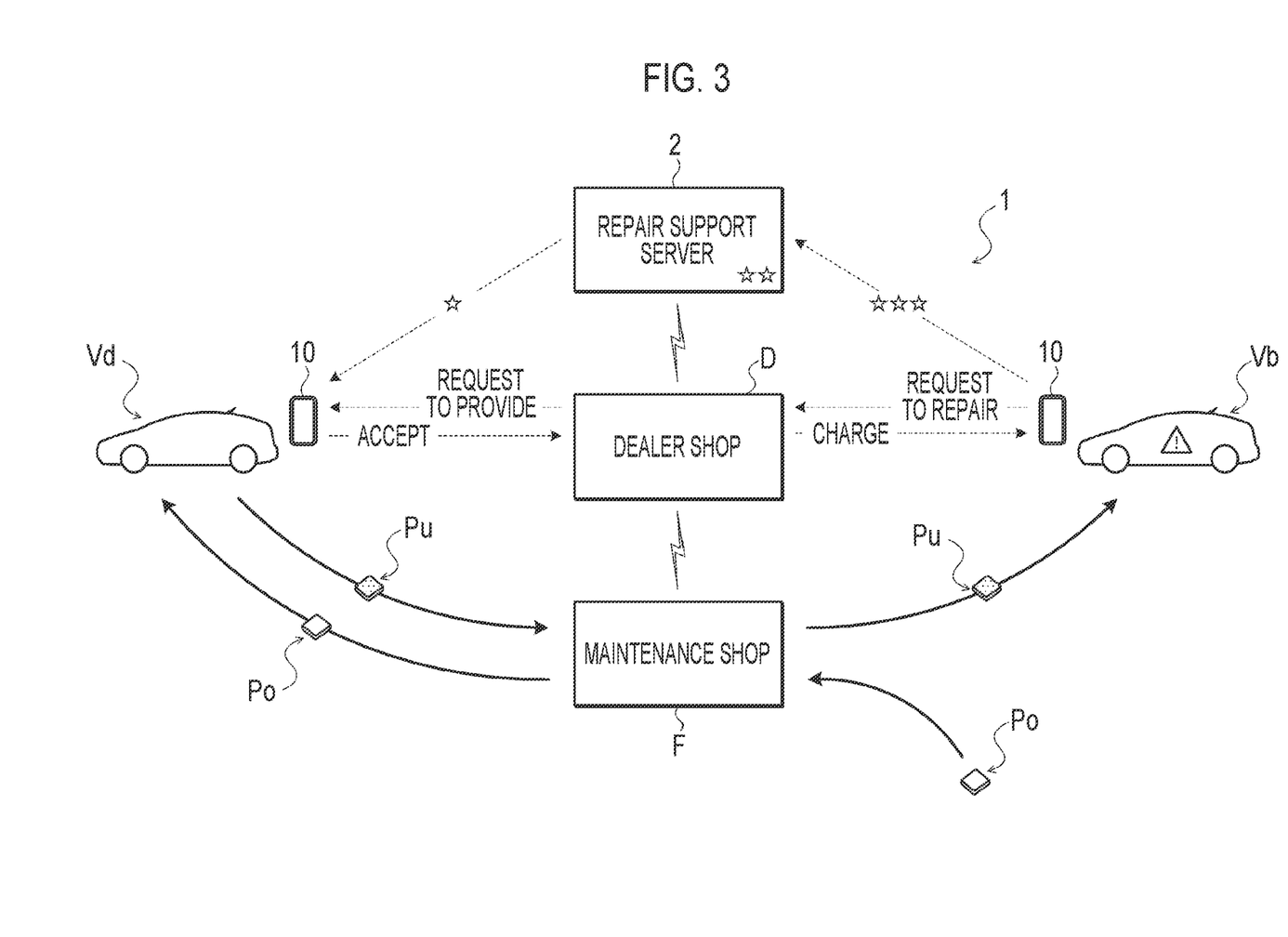
FIG. 3 is an explanatory diagram for describing an example of a support procedure for repairing a failed vehicle by the vehicle repair support system of the present disclosure.

As shown in FIG. 3, when the user of the failed vehicle Vb contacts, for example, the vehicle dealer shop D for a request to repair the failed vehicle, a person in charge at the vehicle dealer shop D hears a diagnosis code displayed on an instrument panel of the failed vehicle Vb and a specific symptom of the defect (failure) from the user of the failed vehicle Vb. In addition, the person in charge decides the scheduled repair date of the failed vehicle Vb based on the schedule of the user and the schedule of the vehicle maintenance shop F (or a maintenance facility of the vehicle dealer shop D), and requests the user to put the failed vehicle Vb into the nearest vehicle maintenance shop F or the vehicle dealer shop D when the failed vehicle Vb can run on its own, and requests the user to wait at a current position when the failed vehicle Vb cannot run on its own. Further, the person in charge at the vehicle dealer shop D accesses the repair support server 2 from the terminal 8, and inputs, in a predetermined form, for example, defect information such as the diagnosis code and the specific symptom of a defect that have been heard from the user, a scheduled repair date, the location of a repairer (vehicle maintenance shop F, or the like) for removing a part from the donor vehicle Vd, and the like, through which the above information is transmitted to the repair support server 2.

Figure 4:
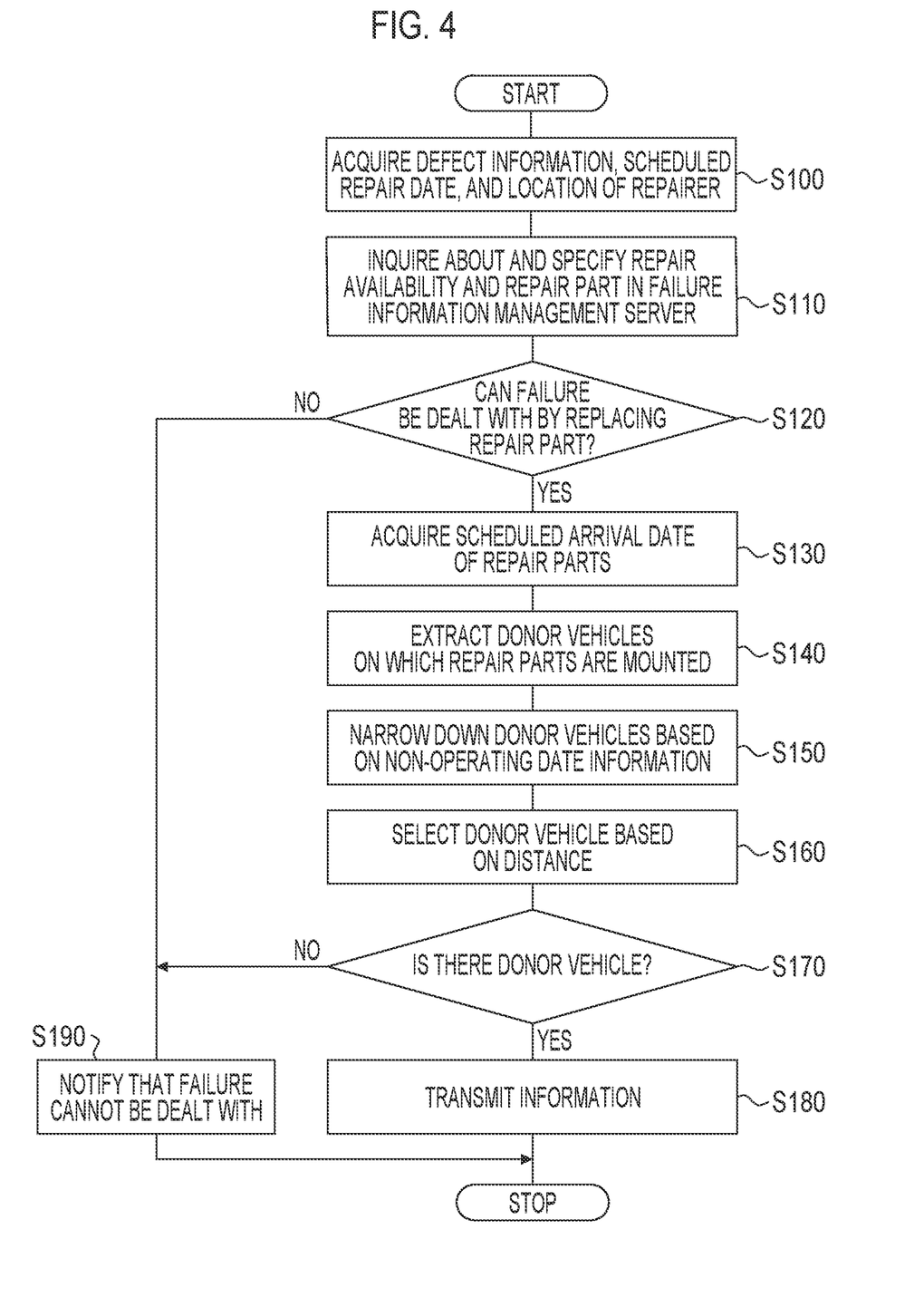
FIG. 4 is a flowchart showing a support procedure for repairing a failed vehicle by the vehicle repair support system of the present disclosure.

When the defect information or the like is transmitted to the repair support server 2, the support management module 20 of the repair support server 2 acquires the defect information from the vehicle dealer shop D, the scheduled repair date, and the location of the repairer, as shown in FIG. 4 (step S100). Further, the support management module 20 transmits the acquired defect information to the failure information management server 3 to determine whether or not the failure generated in the failed vehicle Vb is resolved by replacing a part (step S110). The failure information management server 3 acquires availability of part replacement and IDs of one or more repair parts Pu (see FIG. 3) needed to repair the failed vehicle Vb, based on the defect information (diagnosis code) from the repair support server 2 and the failure information stored in the storage device 35. Further, the failure information management server 3 transmits, to the repair support server 2, information indicating the availability of part replacement and the IDs of the repair parts Pu, and the support management module 20 of the repair support server 2 specifies the availability of part replacement and the repair parts Pu based on the information from the failure information management server 3 (step S110).

When a determination is made based on the information from the failure information management server 3 that the failure generated in the failed vehicle Vb can be resolved by replacing a part (Yes in step S120), the support management module 20 of the repair support server 2 asks the part distribution management server 5 about a delivery date after requesting the order of parts Po (hereinafter referred to as "ordered parts") that are the same as or compatible with the repair parts Pu specified in step S110, that is, a scheduled arrival date of the ordered parts Po at the vehicle dealer shop D or the vehicle maintenance shop F, and acquires the scheduled arrival date from the part distribution management server 5 (step S130). In the present embodiment, the ordered parts Po are mounted on the donor vehicle Vd providing the repair parts Pu in place of the repair parts Pu. Further, the support management module 20 extracts the donor vehicles Vd on which the one or more repair parts Pu are mounted based on the IDs of the repair parts Pu specified in step S110 and the information stored in the storage device 25 (step S140). Here, the donor vehicles Vd extracted in step S140 are not limited to the same vehicle type as the failed vehicle Vb because parts are being standardized, and may include a vehicle type different from the failed vehicle Vb.

Next, the support management module 20 acquires non-operating date information for the donor vehicles Vd extracted from the storage device 25 in step S140, and narrows down the donor vehicles Vd extracted in step S140 based on the non-operating date information, the scheduled repair date acquired in step S100, and the scheduled arrival date of the ordered parts Po acquired in step S130 (step S150). In step S150, the support management module 20 first excludes the donor vehicle Vd having a non-operation probability less than a predetermined threshold value from among the donor vehicles Vd extracted in step S140. In the present embodiment, when the scheduled repair date is the same day, a large value is used as the threshold value as compared with when the scheduled repair date is the next day or later, in order to select the donor vehicle Vd having a high non-operation probability.

Further, in step S150, the support management module 20 excludes the donor vehicle Vd of which the scheduled repair date is not a non-operating date from among the donor vehicles Vd extracted in step S140 when the scheduled repair date is the same day, and excludes the donor vehicle Vd of which, for example, the scheduled repair date and the day before that day are not non-operating dates from among the donor vehicles Vd extracted in step S140 when the scheduled repair date is the next day or later. Further, in step S150, the support management module 20 excludes the donor vehicle Vd of which, for example, the scheduled arrival date of the ordered parts Po and the next day, which have been acquired in step S120, are not the non-operating dates, from among the donor vehicles Vd extracted in step S140.

After executing the operation of step S150, the support management module 20 acquires the addresses or locations of the owners of the donor vehicles Vd narrowed down in step S150 from the database stored in the storage device 25, and calculates the distance on a map between the addresses or locations of the owners and the location of the repairer acquired in step S100 (step S160). Further, in step S160, the support management module 20 selects a candidate vehicle of which the calculated distance is equal to or less than a predetermined threshold value, from among the donor vehicles Vd narrowed down in step S150. Then, when at least one donor vehicle Vd is selected in step S160 (Yes in step S170), the support management module 20 transmits information related to the selected donor vehicle Vd to the terminal 8 of the vehicle dealer shop D (step S180), and ends the process shown in FIG. 4.

The information transmitted from the repair support server 2 to the terminal 8 in step S180 includes the ID of the donor vehicle Vd, the owner, contact information, address or location of the donor vehicle Vd, the scheduled arrival date of the ordered parts Po, and the non-operation probability of the donor vehicle Vd, or the like. Further, in the present embodiment, when the donor vehicles Vd are selected in step S160, the information related to the donor vehicles Vd is transmitted to the terminal 8 in a ranked form based on the non-operation probability, the distances calculated in step S160, and the like in step S180.

On the other hand, when a determination is made in step S120 based on the information from the failure information management server 3 that the failure generated in the failed vehicle Vb cannot be resolved by replacing a part (No in step S120), the support management module 20 notifies the terminal 8 of the vehicle dealer shop D that the failure of the failed vehicle Vb cannot be dealt with by replacing a part (step S190), and ends the process shown in FIG. 4. In this case, the person in charge at the vehicle dealer shop D puts the failed vehicle Vb into the vehicle maintenance shop F through movement of the vehicle itself or by towing, and at the vehicle maintenance shop F, the failed vehicle Vb undergoes needed inspections and then a repair work on the vehicle Vb is repaired.

Further, when the donor vehicle Vd satisfying the conditions is not found by the process in FIG. 4 (No in step S170), the support management module 20 notifies the terminal 8 of the vehicle dealer shop D that the failure of the failed vehicle Vb cannot be dealt with (step S190), and ends the process shown in FIG. 4. In this case, the support management module 20 notifies the terminal 8 of the vehicle dealer shop D of the scheduled arrival date of the ordered parts Po in step S190, and the person in charge at the vehicle dealer shop D informs the user of the failed vehicle Vb of the scheduled arrival date of the ordered parts Po and adjusts the repair schedule, or appropriately changes the search conditions of the donor vehicle Vd and requests the repair support server 2 to search for the donor vehicle Vd again.

Figure 5:
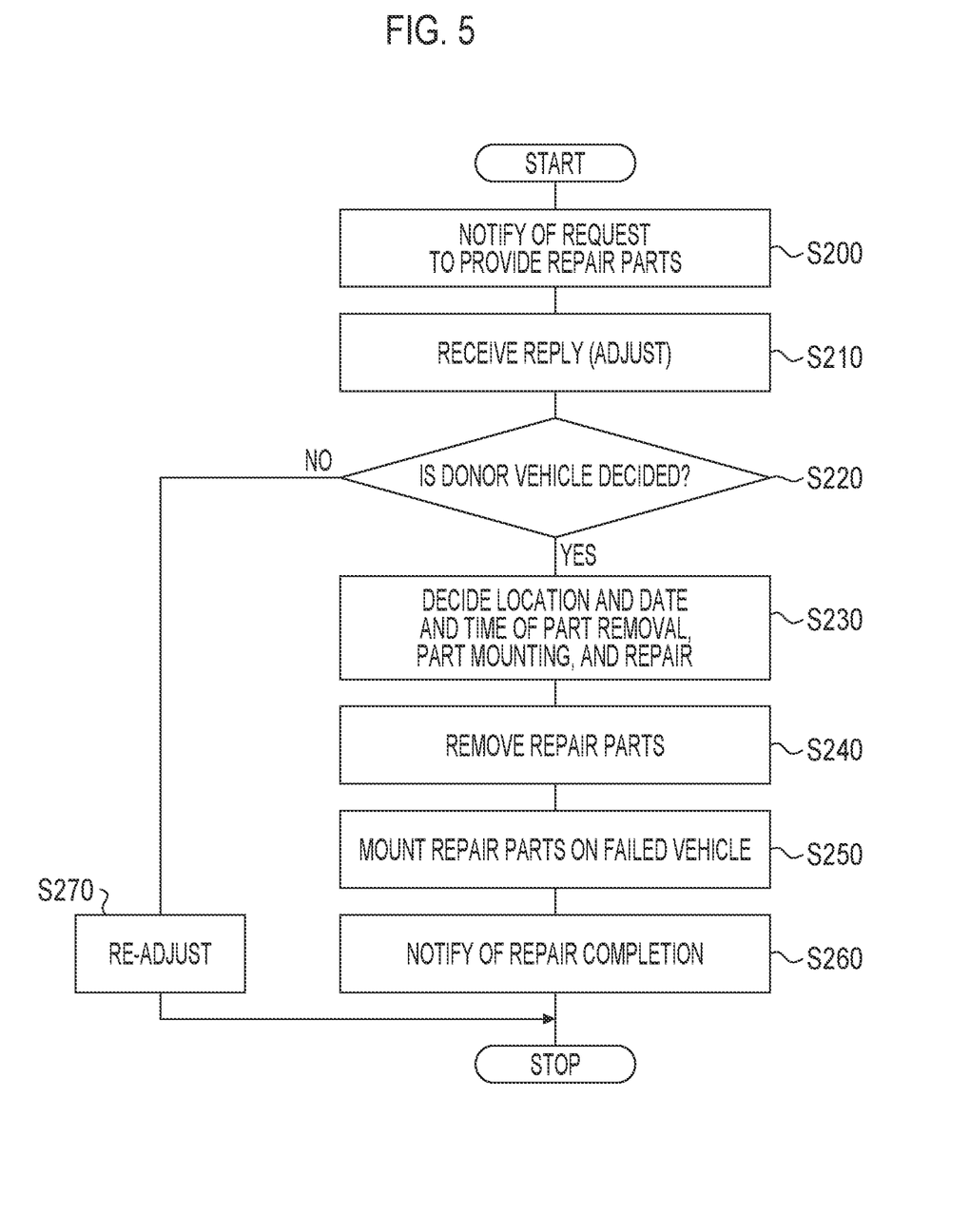
FIG. 5 is a flowchart showing a work flow performed with support of the vehicle repair support system of the present disclosure.

FIG. 5 is a flowchart showing a work flow performed at the vehicle dealer shop D and the vehicle maintenance shop F after the information related to the donor vehicle Vd is transmitted from the repair support server 2 to the terminal 8 of the vehicle dealer shop D. When the information related to the donor vehicles Vd from the repair support server 2 is received by the terminal 8, the person in charge at the vehicle dealer shop D makes appropriate adjustments with the vehicle maintenance shop F based on the acquired information, and then transmits the request to provide repair parts Pu to the user terminal 10 of the owner (individual) of the donor vehicle Vd, the terminal of the used car sales dealer U, or the like (step S200). In the present embodiment, the request to provide the repair parts Pu in step S200 includes a desired part removal date of the vehicle dealer shop D according to the scheduled repair date, the scheduled mounting date of the ordered parts Po, and whether or not the donor vehicle Vd needs to be moved.

Whether or not the donor vehicle Vd needs to be moved is determined according to the ease of removing the repair parts Pu, and in the present embodiment, when the repair parts Pu can be removed from the donor vehicle Vd without performing a large-scale work, a worker (repairer) from the vehicle maintenance shop F or the like goes to the home of the owner or the like of the donor vehicle Vd and removes the repair parts Pu. Further, when the removal of the repair parts Pu from the donor vehicle Vd is complicated, the owner is requested to put the donor vehicle Vd into the vehicle maintenance shop F or the like in the request to provide the repair parts Pu. The request to provide the repair parts Pu in step S200 may be made via a telephone. Further, when the donor vehicles Vd (candidate vehicles) are presented by the repair support server 2, a plurality of owners in step S200 may be collectively (simultaneously) notified of the request to provide the repair parts Pu, or notified of the request to provide the repair parts in the order of rank set by the repair support server 2.

After notification of the request to provide the repair parts Pu, the person in charge at the vehicle dealer shop D receives a reply from the owners and makes appropriate adjustments, and decides the donor vehicle Vd to be a provider of the repair parts Pu (Step S210). When the donor vehicle Vd is decided (Yes in step S220), the person in charge formally decides the removal location and removal date and time of the repair parts Pu and the mounting location and mounting date and time of the ordered parts Po with the owner of the donor vehicle Vd, and formally decides the repair location and the repair date and time with the user of the failed vehicle Vb (step S230). The repair location of the failed vehicle Vb is basically a maintenance facility of the vehicle maintenance shop F or the vehicle dealer shop D, but when the failed vehicle Vb cannot run on its own and the repair parts Pu can be easily mounted to the failed vehicle Vb, the home of the user of the failed vehicle Vb or the stop position of the failed vehicle Vb (parking lot, shoulder, or the like) may be the repair location.

Further, when the removal date and time of the repair parts Pu arrives, the repair parts Pu are removed from the donor vehicle Vd at a predetermined removal location (step S240). Further, when the repair date and time of the failed vehicle Vb arrives, the repair parts Pu removed from the donor vehicle Vd are mounted on the failed vehicle Vb at a predetermined repair location (step S250). When the failure (defect) is resolved by mounting the repair parts Pu and the repair of the failed vehicle Vb is completed, a repair completion notification including vehicle information for the failed vehicle Vb such as chassis number or vehicle identification number and a notification of repair cost, that is, wages and parts cost (price of ordered parts Po), is transmitted to the repair support server 2 (and vehicle dealer shop D) from the terminal 8 of the vehicle dealer shop D or the terminal 9 of the vehicle maintenance shop F (step S260), and the process of FIG. 5 is completed.

On the other hand, when the donor vehicle Vd to be the provider of the repair parts Pu cannot be determined based on the information from the repair support server 2 (No in step S220), the person in charge at the vehicle dealer shop D informs the user of the failed vehicle Vb of the scheduled arrival date of the ordered parts Po and adjusts the repair schedule, or requests the repair support server 2 to search for the donor vehicle Vd again by appropriately changing the search conditions for the donor vehicle Vd (step S270). Further, on the donor vehicle Vd that has provided the repair parts Pu, the separately ordered parts Po are to be mounted at a predetermined mounting location at the mounting date and time (see FIG. 3).

Figure 6:
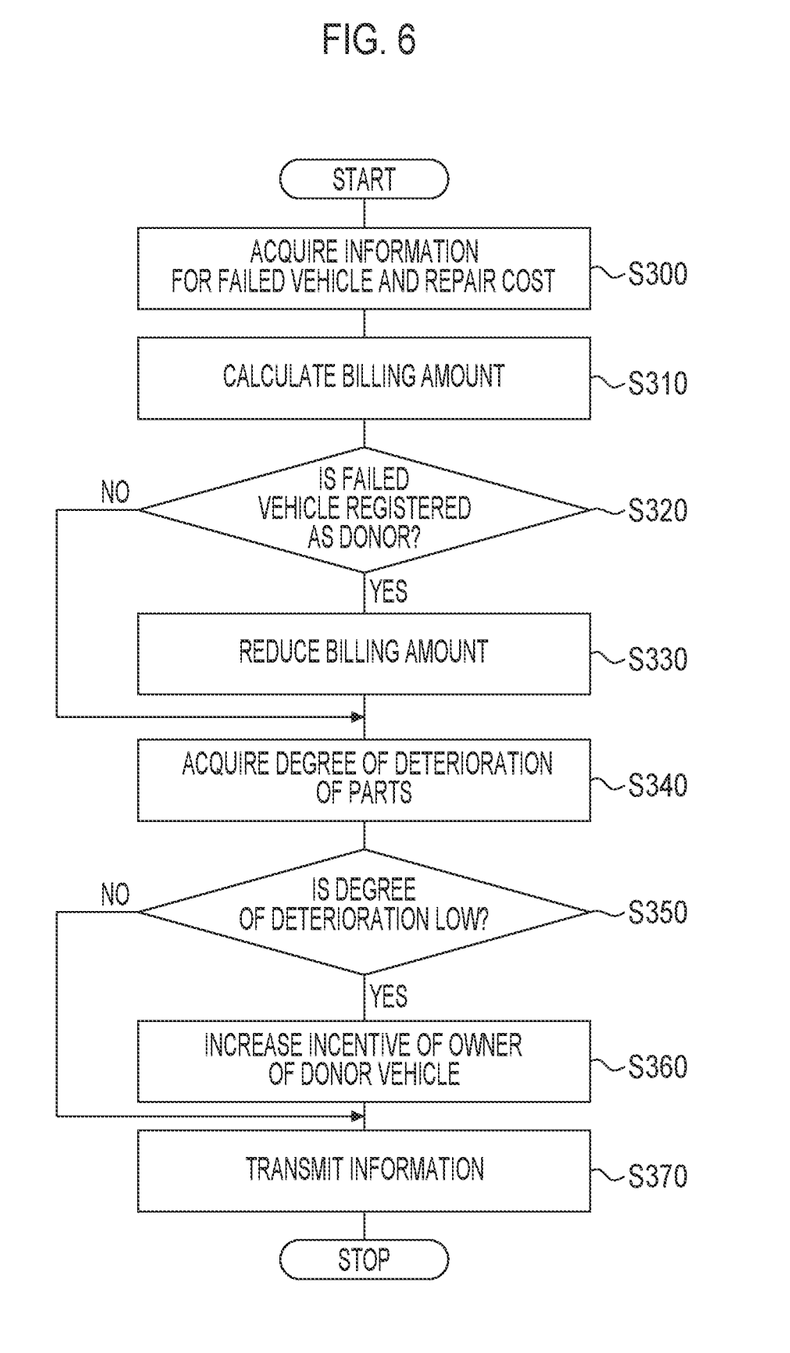
FIG. 6 is a flowchart showing a support procedure for repairing a failed vehicle by the vehicle repair support system of the present disclosure.

As shown in FIG. 6, when the support management module 20 of the repair support server 2 receives the repair completion notification from the terminal 8 of the vehicle dealer shop D or the terminal 9 of the vehicle maintenance shop F, the support management module 20 acquires the vehicle information for the failed vehicle Vb and the repair cost (step S300). Next, the support management module 20 calculates the billing amount for repair for the user of the failed vehicle Vb by adding the repair cost acquired in step S300, an operating cost for repair support server 2 (incentive, see stars in FIG. 3), and the amount equivalent to a base value of the incentive for the owner of the donor vehicle Vd (see stars in FIG. 3) (step S310).

Further, the support management module 20 determines whether or not the failed vehicle Vb is registered as the donor vehicle Vd in the vehicle repair support system 1 based on the vehicle information for the failed vehicle Vb acquired in step S300 and the information stored in the storage device 25 (step S320). When the support management module 20 determines that the failed vehicle Vb is registered as the donor vehicle Vd in the vehicle repair support system 1 (Yes in step S320), the support management module 20 reduces the billing amount calculated in step S310 by a predetermined amount (step S330). Further, when the support management module 20 determines that the failed vehicle Vb is not registered as the donor vehicle Vd in the vehicle repair support system 1 (No in step S320), the support management module 20 skips the operation of step S330 and calculates maintains the billing amount calculated in step S310.

After executing step S310 or S320, the support management module 20 transmits the ID of the donor vehicle Vd and the IDs of the repair parts Pu removed from the donor vehicle Vd to the vehicle diagnosis server 4 in order to acquire the degree of deterioration of the repair parts Pu (step S340). The vehicle diagnosis server 4 acquires the degree of deterioration corresponding to the IDs of the received donor vehicle Vd and the repair parts Pu from the database stored in the storage device 45, and transmits the acquired degree of deterioration to the repair support server 2 (step S340). When the support management module 20 acquires the degree of deterioration of the repair parts Pu from the vehicle diagnosis server 4 in step S340, the support management module 20 determines whether or not the degree of deterioration is equal to or lower than a predetermined threshold value (step S350).

When a determination is made that the degree of deterioration of the repair parts Pu is equal to or lower than the threshold value (Yes in step S350), the support management module 20 considers that the state of the repair parts Pu is extremely good, and increases the incentive for the owner of the donor vehicle Vd by adding a value corresponding to a predetermined amount to the base value (step S360). Further, when the support management module 20 determines that the degree of deterioration of the repair part Pu exceeds the above threshold value (step S350: NO), the support management module 20 adds a value corresponding to a predetermined amount to the base value. Increase the incentive for the owner of the donor vehicle Vd (step S360). Then, the support management module 20 transmits the billing amount set in step S310 or S360 to the terminal 8 of the vehicle dealer shop D. The owner of the donor vehicle Vd is notified of the amount of the incentive given in response to the provision of the repair parts Pu (step S370), and the settlement process of FIG. 6 is ended.

After the settlement process by the repair support server 2 is completed, the vehicle dealer shop D charges the user of the failed vehicle Vb for the billing amount transmitted from the repair support server 2. When the billing amount is deposited from the user, the portion of the deposited money corresponding to the repair cost is to be the consideration for the vehicle dealer shop D and/or the vehicle maintenance shop F, and the remainder is to be used for the operating cost for the repair support server 2. In addition, the incentive to the owner of the donor vehicle Vd may be money, and points that can be used for inspection and maintenance costs at the vehicle dealer shop D, the vehicle maintenance shop F, or the like, the payments at the related facilities, or the like, may be given as incentives.

As described above, the vehicle repair support system 1 mainly supports the procurement of parts in repairing the failed vehicle Vb, and includes the repair support server 2 having the support management module 20 as the support management device and the storage device 25, and the terminal 8 as the request notification device. The storage device 25 of the repair support server 2 stores the IDs of donor vehicles Vd registered in advance in association with the parts (IDs) mounted on the donor vehicles Vd. Further, the support management module 20 of the repair support server 2 specifies the repair parts Pu needed to repair the failed vehicle Vb based on the defect information for the failed vehicle Vb transmitted from the terminal 8, and extracts the donor vehicles Vd on which the repair parts Pu are mounted from among the donor vehicles Vd based on the information stored in the storage device 25 (steps S100 to S160 of FIG. 4). Further, the terminal 8 as the request notification device notifies the owner of the donor vehicle Vd extracted by the support management module 20 of the repair support server 2 of the request to provide the repair parts Pu (step S200 of FIG. 5).

In this way, it is possible to remove the repair parts Pu from the donor vehicle Vd and mount the removed repair parts on the failed vehicle Vb, when the owner of the donor vehicle Vd accepts the request to provide the repair parts Pu, thereby resolving the failure of the failed vehicle Vb. As a result, it is possible to quickly procure the repair parts Pu needed to repair the failed vehicle Vb while the stock of parts at the vehicle dealer shop D, the vehicle maintenance shop F, or the like is reduced. Further, in the vehicle repair support system 1, the repair parts Pu can be quickly procured, and thus, it is possible to complete the repair of the failed vehicle Vb on the same day when the failure occurs, whereby the time from the occurrence of the failure to the completion of the repair of the failed vehicle Vb is significantly shortened, and thus, it is possible to satisfactorily reduce the downtime of the failed vehicle Vb.

Further, in the vehicle repair support system 1, the support management module 20 of the repair support server 2 gives an incentive to the owner who has accepted the request to provide the repair parts Pu (steps S310, S350, and S360 of FIG. 6). In this way, it is possible to urge the owner of the donor vehicle Vd to accept the request to provide the repair parts Pu, which makes it possible to procure the repair parts Pu more quickly.

Further, when the degree of deterioration of the repair parts Pu provided from the donor vehicle Vd is small, the support management module 20 of the repair support server 2 increases the incentive given to the owner, as compared with when the degree of deterioration is large (step S340 to S360 of FIG. 6). In this way, even if the donor vehicle Vd is relatively new, it is possible to suppress a reluctant feeling of the owner of the donor vehicle Vd in providing the repair parts Pu, which makes it possible to procure good repair parts Pu.

Further, the vehicle repair support system 1 includes the vehicle diagnosis server 4 as the part deterioration diagnosis device that acquires usage state information including at least a mileage from the donor vehicle Vd and derives the degree of deterioration of the parts mounted on the donor vehicle Vd based on the usage state information. Further, the support management module 20 of the repair support server 2 acquires the degree of deterioration of the repair parts Pu from the vehicle diagnosis server 4, and decides the incentive given to the owner based on the acquired degree of deterioration (S340 to S360 of FIG. 6). This makes it possible to properly evaluate the degree of deterioration of the parts mounted on the donor vehicle Vd, and to ensure good reliability in procurement of the repair parts Pu from the donor vehicle Vd.

In the vehicle repair support system 1, after executing step S160 of FIG. 4, the same operations as in steps S340 to S360 of FIG. 6 may be performed for the repair parts Pu of the selected donor vehicle Vd, and in requesting the provision of the repair parts Pu, the owner of the donor vehicle Vd may be notified of an incentive decided based on the degree of deterioration of the repair parts Pu. This makes it possible to inform the owner of the relatively new donor vehicle Vd that the provision of the repair parts Pu provides a high incentive, and to urge the owner to accept the request to provide the repair parts Pu.

Further, the support management module 20 of the repair support server 2 calculates the billing amount of the repair request to the user of the failed vehicle Vb, and when the failed vehicle Vb is registered as the donor vehicle Vd, functions as a billing amount calculation device (steps S300 to S330 in FIG. 6) that reduces the billing amount as compared with when the support management module 20 is not registered as the donor vehicle Vd. By giving the owner of the donor vehicle Vd the merit of reducing the cost burden in the event of a failure as described above, it is possible to further promote the registration of donor vehicles Vd and increase the number of registered donor vehicles Vd.

Further, the vehicle repair support system 1 includes the failure information management server 3 that provides information on repair parts Pu according to defect information including a diagnosis code and the like, and the support management module 20 of the repair support server 2 inquires of the failure information management server 3 about the repair parts Pu needed to repair the failed vehicle Vb (step S110 of FIG. 4). This makes it possible to easily and quickly specify the repair parts Pu needed to repair the failed vehicle Vb.

Further, in the vehicle repair support system 1, the defect information for the failed vehicle Vb is transmitted from the terminal 8 installed at the vehicle dealer shop D as the business operator who has received the request to repair the failed vehicle Vb to the repair support server 2 (support management module 20), and the terminal 8 functions as the request notification device that notifies the owner of the donor vehicle Vd of the request to provide repair parts Pu. In this way, it is possible to directly arrange an operating schedule or the like between the owner of the donor vehicle Vd and the vehicle dealer shop D as a contact point for repairing the failed vehicle Vb, which makes it possible to shorten the time from the request to repair the failed vehicle Vb to the repair completion.

Note that, in the vehicle repair support system 1, the owner of the donor vehicle Vd may be notified of the request to provide the repair parts Pu, from the terminal 9 of the vehicle maintenance shop F as the request notification device. Further, the owner of the donor vehicle Vd may be notified of the request to provide the repair parts Pu, from the support management module 20 as the request notification device after executing step S170 of FIG. 4. That is, the support management module 20 of the repair support server 2 may function as both the support management device and the request notification device.

Further, the support management module 20 of the repair support server 2 narrows down the donor vehicles Vd to the donor vehicle Vd on which the repair parts Pu are mounted based on the scheduled repair date of the failed vehicle Vb and the non-operating date information indicating the scheduled non-operating date of the donor vehicles Vd (step S150 of FIG. 4). In this way, it is possible to restrain the owner of the donor vehicle Vd who cannot provide the repair parts Pu by the scheduled repair date due to the operation from being notified of the request to provide the repair parts Pu, and to increase the probability that the request to provide the repair parts Pu is accepted.

Further, in the vehicle repair support system 1, the non-operating date information include the non-operation probability that the donor vehicle Vd is non-operating on the scheduled non-operating date, where the non-operation probability is set based on the scheduled non-operating date provided from the owner of the donor vehicle Vd and the usage status of the donor vehicle Vd. Further, the storage device 25 of the repair support server 2 stores the non-operating date information in association with the ID of the donor vehicle Vd. Further, the support management module 20 of the repair support server 2 preferentially extracts the donor vehicle Vd for which the non-operation probability is relatively high from the donor vehicles Vd on which the repair parts Pu are mounted, based on the non-operating date information (step S150 of FIG. 4). In this way, it is possible to extremely well restrain the owner of the donor vehicle Vd who cannot provide the repair parts Pu by the scheduled repair date due to the operation from being notified of the request to provide the repair parts Pu.

Further, the support management module 20 of the repair support server 2 at least acquires the distance between the position of the donor vehicle Vd (address, location, or the like, of the owner) and the location of the repairer (vehicle maintenance shop F or the like) for removing the repair parts Pu from the donor vehicle Vd, and preferentially extracts (selects) the donor vehicle Vd to which a distance is relatively short from among the donor vehicles Vd on which the repair parts Pu are mounted (step S160 of FIG. 4). In this way, it is possible to further shorten the time from the request to repair the failed vehicle Vb to the acquisition of the repair parts Pu, and to reduce the distribution cost needed to procure the part.

Figure 7:
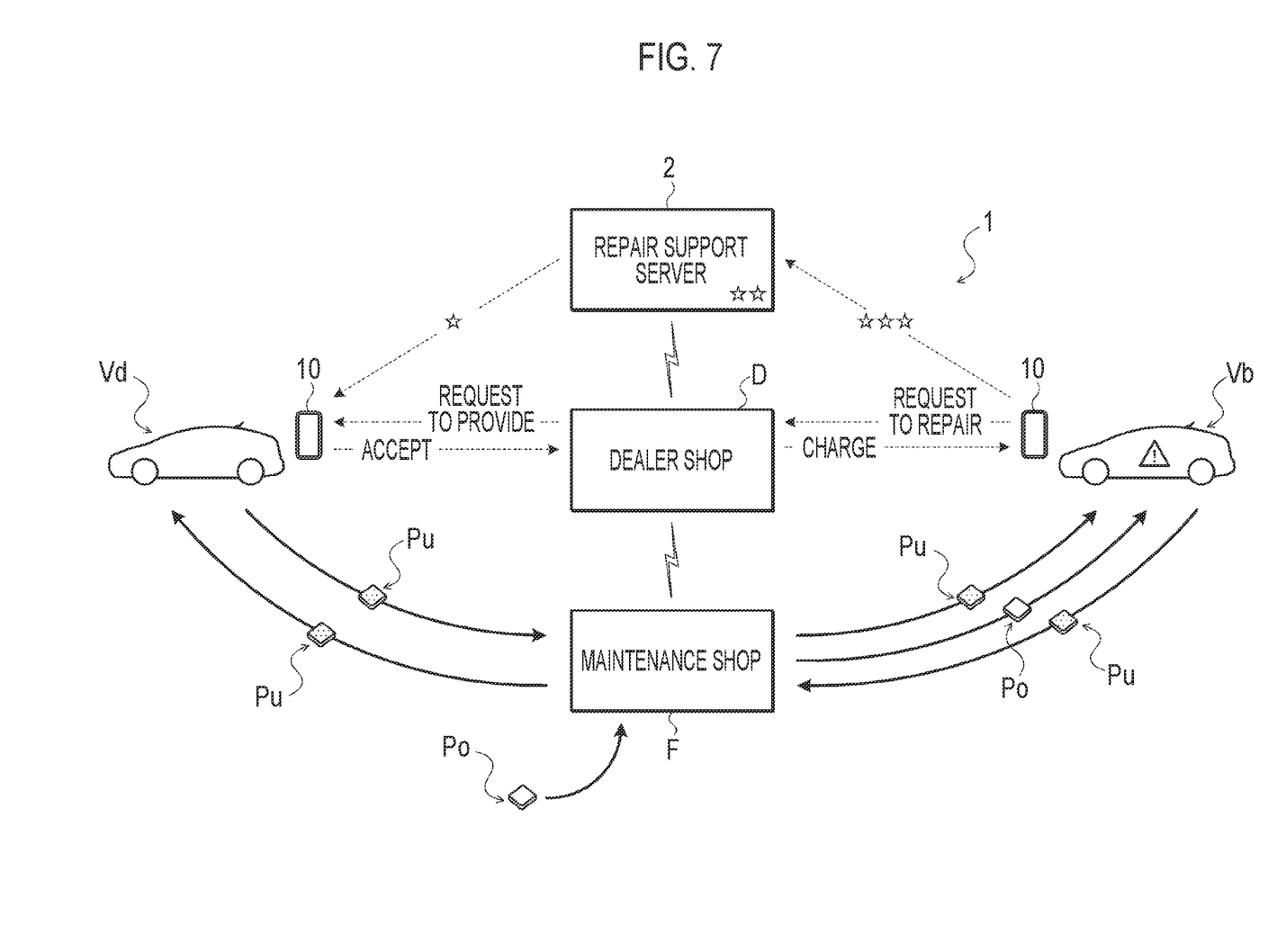
FIG. 7 is an explanatory diagram for describing another example of the support procedure for repairing a failed vehicle by the vehicle repair support system of the present disclosure.
Figure 8:
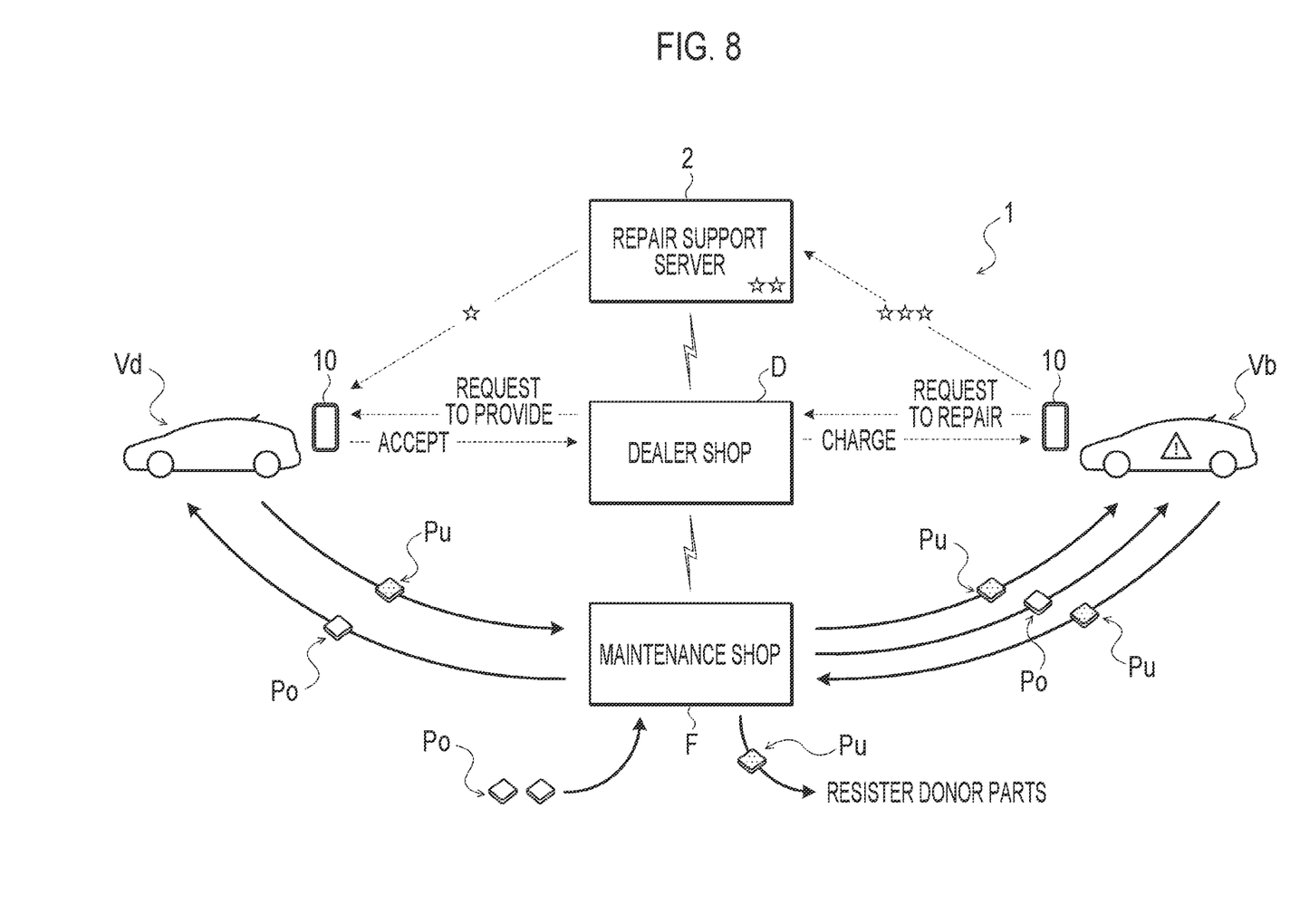
FIG. 8 is an explanatory diagram for describing still another example of the support procedure for repairing a failed vehicle by the vehicle repair support system of the present disclosure.

Further, as shown in FIG. 3, in the vehicle repair support system 1, the repair parts Pu removed from the donor vehicle Vd is mounted on the failed vehicle Vb, and the separately ordered parts Po are mounted on the donor vehicle Vd. In this way, it is possible to provide the ordered parts Po, which are new parts, to the owner of the donor vehicle Vd as an incentive in response to the provision of the repair parts Pu. Note that, as shown in FIG. 7, after the repair parts Pu removed from the donor vehicle Vd is temporarily mounted on the failed vehicle Vb, the repair parts Pu may be returned to the donor vehicle Vd and thereafter, the separately ordered parts Po may be mounted on the failed vehicle Vb. In this way, it is possible to meet the intention of the owner of the donor vehicle Vd who wants to continue to use parts (repair parts Pu) mounted from the beginning. Further, as shown in FIG. 8, after the repair parts Pu removed from the donor vehicle Vd is temporarily mounted on the failed vehicle Vb, the ordered parts Po, which are separately ordered, may be mounted on the respective donor vehicle Vd and the failed vehicle Vb and the repair parts Pu removed from the failed vehicle Vb may be stocked in place as donor parts.

In the vehicle repair support system 1, the donor vehicles Vd include at least one of a private car, a used car, a car-sharing vehicle, an exhibition car, and a rental car. In this way, it is possible to quickly repair the failed vehicle Vb by effectively utilizing the parts mounted on idle vehicles such as non-operating private cars, rental cars, car-sharing vehicles, and used cars, which makes it possible to satisfactorily reduce the downtime of the failed vehicle Vb.

It goes without saying that the present disclosure is not limited to the embodiment described above, and various changes can be made within the scope of the present disclosure. Further, the above embodiment is merely a specific embodiment of the disclosure described in Summary section of the present specification, and does not limit the elements of the disclosure described in the Summary section.

The aspects of the disclosure can be used in the manufacturing and sales business of vehicles and the like.

What is claimed is:

1. A vehicle repair support system for supporting repair of a failed vehicle, the vehicle repair support system comprising:
   a repair support server having:
      a storage device configured to store IDs of a plurality of donor vehicles registered in advance and parts mounted on the donor vehicles in association with each other; and
      a support management device configured to:
         acquire defect information from a vehicle dealer shop, a scheduled repair date, and a location of a repairer;
         specify a repair part needed to repair the failed vehicle based on defect information for the failed vehicle;
         transmit the acquired defect information to a failure information management server; and
         extract a donor vehicle on which the repair part is mounted from among the donor vehicles based on information stored in the storage device;
   the failure information management server is configured to determine whether or not a failure generated in the failed vehicle is resolved by replacing a part, when the replacing of the part resolves the failure generated in the failed vehicle, the failure information management server transmits to the repair support server, information indicating an availability of part replacement; and
   a request notification device configured to notify an owner of the donor vehicle extracted by the support management device of a request to provide the repair part,
   wherein in response to the notification to the owner, facilitating delivery of the part by removing the part, parking the donor vehicle, or positioning the donor vehicle at a vehicle maintenance shop based on the identified part type.

2. The vehicle repair support system according to claim 1, wherein the support management device gives an incentive to the owner who has accepted the request to provide the repair part.

3. The vehicle repair support system according to claim 2, wherein the support management device increases the incentive given to the owner when a degree of deterioration of the repair part provided from the donor vehicle is small, as compared with when the degree of deterioration is large.

4. The vehicle repair support system according to claim 3, further comprising a part deterioration diagnosis device configured to acquire usage state information including at least a mileage from the donor vehicle and derive the degree of deterioration of the part mounted on the donor vehicle based on the usage state information,
   wherein the support management device sets the incentive given to the owner based on the degree of deterioration of the repair part acquired from the part deterioration diagnosis device.

5. The vehicle repair support system according to claim 1, further comprising a billing amount calculation device configured to calculate a billing amount for repair for a user of the failed vehicle, and reduce the billing amount when the failed vehicle is registered as the donor vehicle as compared with when the failed vehicle is not registered as the donor vehicle.

6. The vehicle repair support system according to claim 1, wherein the failure information management server is further configured to provide information on the repair part according to the defect information,
- wherein the support management device inquires of the failure information management device about the repair part needed to repair the failed vehicle.

7. The vehicle repair support system according to claim 1, wherein the defect information is transmitted from a business operator who has received a request to repair the failed vehicle to the support management device, and the request notification device is installed in the business operator.

8. The vehicle repair support system according to claim 1, wherein the support management device narrows down the donor vehicles to the donor vehicle on which the repair part is mounted based on a scheduled repair date for the failed vehicle and non-operating date information indicating scheduled non-operating dates of the donor vehicles.

9. The vehicle repair support system according to claim 8, wherein:
- the non-operating date information includes a probability that the donor vehicle is non-operating on the scheduled non-operating date provided from the owner of the donor vehicle, the probability being set based on the scheduled non-operating date and a usage status of the donor vehicle;
- the storage device stores the non-operating date information in association with the ID of the donor vehicle; and
- the support management device preferentially extracts the donor vehicle for which the probability is relatively high from among the donor vehicles on which the repair part is mounted based on the non-operating date information.

10. The vehicle repair support system according to claim 1, wherein the support management device acquires at least a distance between a position of the donor vehicle and a location of a repairer for removing the repair part from the donor vehicle, and preferentially extracts the donor vehicle to which the distance is relatively short from among the donor vehicles on which the repair part is mounted.

11. The vehicle repair support system according to claim 1, wherein the repair part removed from the donor vehicle is mounted on the failed vehicle, and a separately ordered part is mounted on the donor vehicle.

12. The vehicle repair support system according to claim 1, wherein after the repair part removed from the donor vehicle is temporarily mounted on the failed vehicle, the repair part is returned to the donor vehicle and a separately ordered part is mounted on the failed vehicle.

13. The vehicle repair support system according to claim 1, wherein after the repair part removed from the donor vehicle is temporarily mounted on the failed vehicle, a separately ordered part is mounted on each of the donor vehicle and the failed vehicle and the repair part removed from the failed vehicle is stocked.

14. The vehicle repair support system according to claim 1, wherein the donor vehicles include at least one of a private car, a used car, a car-sharing vehicle, an exhibition car, and a rental car.

15. A vehicle repair support method for supporting repair of a failed vehicle, the vehicle repair support method comprising:
- storing IDs of a plurality of donor vehicles registered in advance and parts mounted on the donor vehicles in association with each other in a storage device;
- acquiring, via a repair support server, defect information from a vehicle dealer shop, a scheduled repair date, and a location of a repairer;
- specifying, via the repair support server, a repair part needed to repair the failed vehicle based on defect information for the failed vehicle;
- transmitting, via the repair support server, the acquired defect information to a failure information management server;
- determining, via the failure information management server, whether or not a failure generated in the failed vehicle is resolved by replacing a part;
- when the replacing of the part resolves the failure generated in the failed vehicle, the failure information management server transmitting to the repair support server, information indicating an availability of part replacement;
- extracting a donor vehicle on which the repair part is mounted from among the donor vehicles based on information stored in the storage device;
- notifying an owner of the extracted donor vehicle to provide the repair part, and
- in response to the notification to the owner, facilitating delivery of the part by removing the part, parking the donor vehicle, or positioning the donor vehicle at a vehicle maintenance shop based on the identified part type.

* * * * *